United States Patent
Yamada et al.

(10) Patent No.: US 9,193,127 B2
(45) Date of Patent: Nov. 24, 2015

(54) SINGLE FACER AND CORRUGATING ROLL PAIR EXCHANGING METHOD THEREFOR

(71) Applicant: KABUSHIKI KAISHA ISOWA, Nagoya-shi, Aichi (JP)

(72) Inventors: Takahiro Yamada, Kasugai (JP); Hisashi Hayashi, Kiyosu (JP); Naoki Mori, Komaki (JP)

(73) Assignee: KABUSHIKI KAISHA ISOWA, Nagoya-Shi (JP)

( * ) Notice: Subject to any disclaimer, the term of this patent is extended or adjusted under 35 U.S.C. 154(b) by 0 days.

(21) Appl. No.: 14/336,569

(22) Filed: Jul. 21, 2014

(65) Prior Publication Data
US 2015/0030713 A1    Jan. 29, 2015

(30) Foreign Application Priority Data
Jul. 26, 2013 (JP) ................................. 2013-155583

(51) Int. Cl.
| | | |
|---|---|---|
| B31F 1/20 | (2006.01) | |
| B31F 1/28 | (2006.01) | |
| B29C 43/46 | (2006.01) | |
| B29C 53/24 | (2006.01) | |

(52) U.S. Cl.
CPC ............. *B31F 1/20* (2013.01); *B31F 1/2868* (2013.01); *B29C 53/24* (2013.01); *B29C 2043/463* (2013.01); *B31F 2201/00* (2013.01)

(58) Field of Classification Search
CPC ..... B29C 2043/463; B29C 53/24; B31F 1/20; B31F 1/2868
See application file for complete search history.

(56) References Cited

U.S. PATENT DOCUMENTS

| 4,818,330 | A |  | 4/1989 | Mosburger |
| 8,376,014 | B2 | * | 2/2013 | Wu ................................ 156/472 |
| 8,512,025 | B1 | * | 8/2013 | Chen ............................. 425/186 |

FOREIGN PATENT DOCUMENTS

| DE | 36 35 638 C1 | 4/1988 |
| JP | 63-115731 A | 5/1988 |
| JP | 11-198256 A | 7/1999 |

OTHER PUBLICATIONS

Extended European Search Report in corresponding European Application No. 14002511.5, dated Dec. 18, 2014, 6 pages.

* cited by examiner

*Primary Examiner* — James Mackey
(74) *Attorney, Agent, or Firm* — Brinks Gilson & Lione

(57) ABSTRACT

Disclosed is a single facer for producing a plurality of types of single-faced corrugated paperboard sheets having different flute configurations. The single facer of the present invention comprises: a plurality of corrugating roll pairs; a plurality of cartridges each pivotally supporting a pair of corrugating rolls arranged in an up-down direction in a respective one of the corrugating roll pairs, each of the cartridges being selectively serving as an operational cartridge supporting one of the corrugating roll pairs located in an operational position, and a rest cartridge supporting one of the corrugating roll pairs located in a rest position; and a single facer body having a frame structure internally formed with a transfer space for the cartridges, wherein the operational cartridge is disposed above the rest cartridge in such a manner that the operational cartridge is supported from therebelow by the rest cartridge.

5 Claims, 6 Drawing Sheets

SINGLE FACER AND CORRUGATING ROLL PAIR EXCHANGING METHOD THEREFOR

RELATED APPLICATIONS

This application claims priority under 35 U.S.C. §119 to Japanese Patent Application No. 2013-155583 filed on Jul. 26, 2013, the entire content of which is hereby incorporated by reference.

BACKGROUND OF THE INVENTION

1. Field of the Invention

The present invention relates to a single facer, and a corrugating roll pair exchanging method therefor. In particular, the present invention relates to a single facer equipped with a plurality of corrugating roll pairs and configured to produce a plurality of types of single-faced corrugated paperboard sheets having different flute (waved flute) configurations, while exchanging the corrugating roll pairs, and a method of exchanging the corrugating roll pairs.

2. Description of the Related Art

Generally, a single facer is a machine for producing a single-faced corrugated paperboard sheet which comprises a corrugated medium formed from a planar corrugating medium to have a flute configuration and a planar linerboard bonded to flute tips of the corrugated medium.

Recent years, along with an increasing need to produce a plurality of types of single-faced corrugated paperboard sheets having different flute configurations by using only one single facer, there has been developed a single facer equipped with a plurality of corrugating roll pairs (each consisting of a combination of an upper corrugating roll and a lower corrugating roll) and capable of exchanging the corrugating roll pairs when needed, as disclosed in JP 63-115731A (Patent Document 1) and U.S. Pat. No. 4,818,330A (Patent Document 2).

The Patent Document 1 discloses a single facer in which a plurality of types of corrugating roll pairs having different wave profiles are attached to and arranged in an up-down direction along walls of a slidable member located on axially opposite sides of the corrugating roll pairs, and the slidable member is supported linearly movably with respect to a frame in such a manner to allow the lower corrugating roll in each of the corrugating roll pairs to come into press contact with a pressure roll on a timely basis. The single facer disclosed in the Patent Document 1 makes it possible to complete changeover to a required corrugating roll pair within a short period of time by linearly moving the slidable member in the up-down direction with respect to the frame.

The Patent Document 2 discloses a single facer in which at least two corrugating roll pairs are attached, respectively, to separate bearing brackets, and each of the bearing brackets is attached to a support in such a manner as to be pivotally swingable between an inward operational (work) position and an outward rest position. The single facer disclosed in the Patent Document 2 makes it possible to complete changeover to a required corrugating roll pair within a short period of time by swingingly moving the bearing brackets inwardly and outwardly.

SUMMARY OF THE INVENTION

Technical Problem

However, the conventional single facers disclosed in the above Patent Documents 1 and 2 have the following problems.

In the single facer disclosed in the Patent Document 1, when the slidable member is linearly moved to an upper position of the frame to produce a single-faced corrugated paperboard sheet using one of the corrugating roll pairs attached to a lower region of the slidable member, a void space is formed just below the slidable member, and the slidable member loses an element for supporting it from therebelow. The slidable member provided with the plurality of corrugating roll pairs is a heavy object having a weight, for example, of about 7 to 8 ton. Thus, in the situation where a void space is formed just below the slidable member, and the slidable member loses an element for supporting it from therebelow, positioning and fixing of the corrugating roll pair with respect to the frame is liable to become unstable. Particularly, instability in the positioning and fixing of the corrugating roll pair during a production process of single-faced corrugated paperboard sheets causes a problem that a defect, for example, in corrugation of a corrugating medium or in bonding between a corrugated medium and a linerboard, is likely to occur. The instability in the positioning and fixing of the corrugating roll pair also causes a problem that machine vibration increases and thereby the corrugating roll pair is more likely to undergo wear or damage.

Further, when the internal corrugating roll pair (corrugating roll pair inside the single facer) is worn or damaged, it is necessary to replace the worn or damaged corrugating roll pair with an external corrugating roll pair (corrugating roll pair outside the single facer). This replacing work is not always easy. When the corrugating roll pair located at a position higher than a floor of a factory is detached from the slidable member, it is necessary to use a lifting and lowering device capable of conveying a heavy object. Thus, it needs to take a long time for a corrugating roll pair exchanging work including the replacing work.

In the single facer disclosed in the Patent Document 2, the bearing bracket provided with the corrugating roll pair as a heavy object is configured to be pivotally swingably moved. Thus, positioning and fixing of the corrugating roll pair is also liable to become unstable. Therefore, a defect, for example, in corrugation of a corrugating medium or in bonding between a corrugated medium and a linerboard, is likely to occur, and, due to an increase in machine vibration, the corrugating roll pair is likely to undergo wear or damage, as with the single facer disclosed in the Patent Document 1.

In either case where the corrugating roll pair is set in the operational position or in the rest position, the corrugating roll pair is located at a position higher than a floor of a factory. Thus, it needs to take a long time for a corrugating roll pair exchanging work including a corrugating roll pair replacement work.

The present invention has been made to solve the above problems, and a first object thereof is to provide a single facer equipped with a plurality of corrugating roll pairs and configured to produce a plurality of types of single-faced corrugated paperboard sheets having different flute configurations, while exchanging the corrugating roll pairs, wherein the single facer is capable of enhancing stability in terms of positioning and fixing of one of the corrugating roll pairs located in an operational position.

It is a second object of the present invention to provide a corrugating roll pair exchanging method for the single facer, capable of simplifying a corrugating roll pair exchanging work including a corrugating roll pair replacement work.

Solution to Technical Problem

In order to achieve the above object, the present invention provides a single facer for producing a plurality of types of single-faced corrugated paperboard sheets having different flute configurations. The single facer comprises: a plurality of corrugating roll pairs; a plurality of cartridges each pivotally supporting a pair of corrugating rolls arranged in an up-down direction in a respective one of the corrugating roll pairs, each of the cartridges being selectively serving as an operational cartridge supporting one of the corrugating roll pairs located in an operational position where one type of single-faced corrugated paperboard sheet is produced, and a rest cartridge supporting one of the corrugating roll pairs located in a rest position where no single-faced corrugated paperboard sheet is produced; and a single facer body having a frame structure internally formed with a transfer space for the cartridges, wherein the operational cartridge is disposed above the rest cartridge in such a manner that the operational cartridge is supported from therebelow by the rest cartridge.

In the single facer of the present invention, the operational cartridge is disposed above the rest cartridge in such a manner that the operational cartridge is supported from therebelow by the rest cartridge, so that it becomes possible to supplement strength of the frame structure of the single facer body to thereby enhance stability in positioning and fixing of the corrugating roll pair as a heavy object.

Specifically, each of the cartridges is configured to pivotally support the pair of corrugating rolls arranged in an up-down direction as a heavy object. This means that the cartridge is designed to be enhanced in up-down directional strength. Thus, as a result of supporting the operational cartridge from therebelow by the rest cartridge enhanced in up-down directional strength with the same level, it becomes possible to supplement the strength of the frame structure of the single facer body to thereby stably position and fix the corrugating roll pair located in the operational position. In addition, the rest cartridge supporting the operational cartridge from therebelow can be disposed at a position close to a floor of a factory, so that it becomes possible to perform a corrugating roll pair exchanging work including a corrugating roll pair replacing work, easily within a short period of time.

Therefore, in a single facer equipped with a plurality of corrugating roll pairs and configured to produce a plurality of types of single-faced corrugated paperboard sheets having different flute configurations, while exchanging the corrugating roll pairs, the present invention makes it possible to enhance stability in terms of the positioning and fixing of one of the corrugating roll pairs located in the operational position. The present invention also makes it possible to simplify the corrugating roll pair exchanging work including the corrugating roll pair replacing work, in the above single facer.

Preferably, in the single facer of the present invention, the number of the corrugating roll pairs is three or more, wherein each of the three or more corrugating roll pairs is pivotally supported by a respective one of the cartridges, in such a manner that one of the cartridges serves as the operational cartridge, and each of the remaining two or more cartridges serves as the rest cartridge, and wherein the one operational cartridge is supported from therebelow by one of the two or more rest cartridges.

Preferably, the single facer of the present invention further comprises a locking member for supporting the operational cartridge, and an actuating member for pushing the rest cartridge upwardly.

According to this feature of the present invention, it becomes possible to allow the single facer body, the locking member and the actuating member to come into close contact with each other. Thus, the operational cartridge and the rest cartridge can function as a supporting post provided to stand in the up-down direction within the transfer space of the single facer body, to thereby further enhance the strength of the frame structure of the single facer body.

Further, it is also possible to position and fix the operational cartridge and the rest cartridge in such a manner as to clampingly press them against each other in the up-down direction by the locking member and the actuating member. Thus, the operational cartridge and the rest cartridge become less likely to undergo displacement not only in the up-down direction but also in a lateral direction. Further, the operational cartridge is apparently united with the rest cartridge, so that resonant vibration of the operational cartridge occurring during operation of the single facer is significantly reduced.

Therefore, according to this feature of the present invention, it becomes possible to further enhance stability in terms of the positioning and fixing of the corrugating roll pair located in the operational position, while enhancing the frame strength of the single facer body, and reduce wear or the like of the corrugating roll pair.

Preferably, the operational cartridge is configured to be engaged with and supported by the rest cartridge. The engagement between the two cartridges makes it possible to further reliably prevent the displacement.

Preferably, the single facer of the present invention, the locking member includes a clamp mechanism configured to clamp a lateral side of the operational cartridge, and the actuating member includes a hydraulic jack configured to push a lower surface of the rest cartridge upwardly.

According to this feature of the present invention, the operational cartridge can be strongly locked to the frame structure of the single facer body by using the clamp mechanism, and further a required pushing force can be stably maintained by the hydraulic jack.

Preferably, in the single facer of the present invention, the single facer further comprises within the single facer body: an up-down directional transfer passage for allowing each of the cartridges to be transferred in an up-down direction; a lateral transfer passage communicated with a lower end of the up-down directional transfer passage to allow the cartridge to be transferred in a lateral direction; a lifting and lowering device for lifting and lowering the cartridge between the operational position and the rest position in the up-down direction through the up-down directional transfer passage; and a conveyance device for retracting the cartridge from the rest position in the lateral direction within the lateral transfer passage.

According to this feature of the present invention, the lifting and lowering device and the conveyance device are provided inside the single facer body, so that it becomes possible to readily retract the cartridges currently serving, respectively, as the operational cartridge and the rest cartridge as heavy objects, from (via) the rest position in the lateral direction, and then readily transfer the retracted cartridge pivotally supporting a required one of the corrugating roll pairs to the operational position via the rest position. Thus, it becomes possible to perform a work of exchanging between the operational cartridge and the rest cartridge inside the single facer, and a work of replacing an internal cartridge with an external cartridge, easily within a short period of time. That is, according to this feature of the present invention, it becomes possible to simplify the corrugating roll pair exchanging work including the corrugating roll pair replacing work.

The present invention also provides a corrugating roll pair exchanging method for the above single facer. The method comprises the steps of: retracting a first cartridge currently serving as the rest cartridge from the rest position in the lateral direction; transferring a second cartridge currently serving as the operational cartridge from the operational position to retract the second cartridge to a position different from that of the first cartridge; transferring the retracted first cartridge to the operational position via the rest position to allow the first cartridge to serve as the operational cartridge; and transferring the retracted second cartridge to the rest position to allow the second cartridge to serve as the rest cartridge, whereby the corrugating roll pair located in the operational position and the corrugating roll pair located in the rest position are exchanged.

In the corrugating roll pair exchanging method of the present invention, the cartridges currently serving, respectively, as the operational cartridge and the rest cartridge, are retracted into different positions (retraction positions) set inside the single facer, once; and the retracted cartridge pivotally supporting a required one of the corrugating roll pairs is first returned to the rest position and then transferred to the operational position, whereby the operational cartridge and the rest cartridge are exchanged. Thus, during the exchanging between the operational cartridge and the rest cartridge, no interference between the cartridges occurs.

Therefore, the present invention makes it possible to perform the corrugating roll pair exchanging work including the corrugating roll pair replacing work, easily within a short period of time, and in a simplified manner.

DETAILED DESCRIPTION OF THE PREFERRED EMBODIMENTS

With reference to the drawings, a single facer according to an embodiment of the present invention will be described in detail. First of all, a general structure of the single facer according to the embodiment will be described, and then a process for positioning and fixing a corrugating roll pair during operation of the single facer will be described. Further, an internal corrugating roll pair exchanging process, and an internal-external corrugating roll pair replacing process, during non-operation of the single facer, will be described.
<General Structure of Single Facer>

Figure 1:
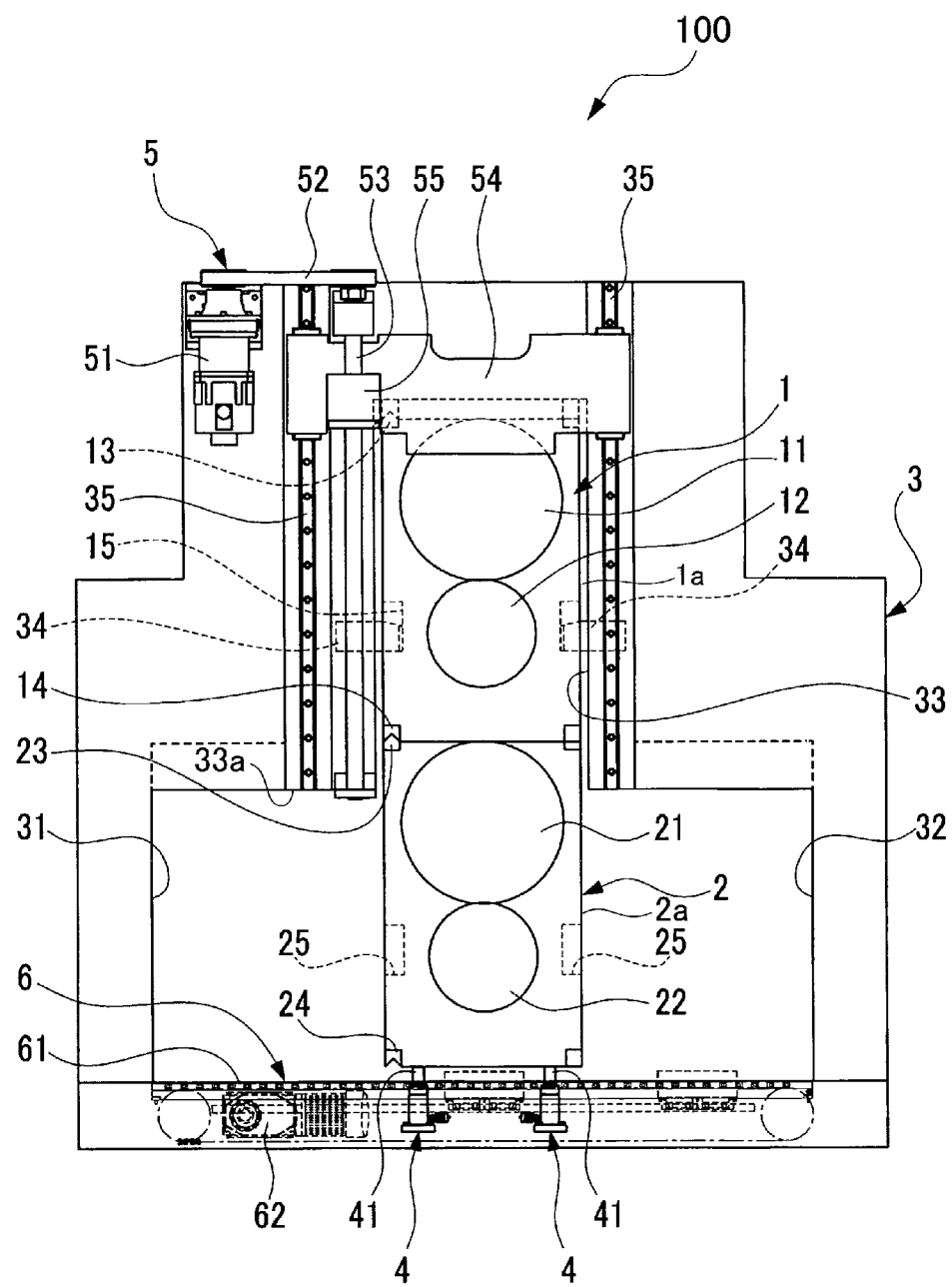
FIG. 1 is a front view of a single facer according to an embodiment of the present invention.

With reference to FIG. 1, a general structure of the single facer according to an embodiment will first be described. FIG. 1 is a front view illustrating the single facer according to the embodiment.

As illustrated in FIG. 1, the single facer 100 according to the embodiment is a single facer internally equipped with a plurality of corrugating roll pairs and configured to produce a plurality of types of single-faced corrugated paperboard sheets having different flute configurations, while exchanging the corrugating roll pairs. The single facer 100 comprises a single facer body 3, a first cartridge 1, and a second cartridge 2.

In the embodiment, in order to cope with two different flute configurations, two types of fluted portions having different configuration are formed, respectively, in a pair of corrugating rolls 11, 12 and a pair of corrugating rolls 21, 22.

The first cartridge 1 is a cartridge pivotally supporting axially opposite ends of the corrugating roll pair (11, 12) currently located in an operational position. The second cartridge 2 is a cartridge pivotally supporting axially opposite ends of the corrugating roll pair (21, 22) currently located in a rest position. The term "operational position" herein means a position which is set inside the single facer 100 and in which one of the corrugating roll pairs is used for production of one type of single-faced corrugated paperboard sheet. The term "rest position" herein means a position which is set inside the single facer 100 and in which one of the corrugating roll pairs is in a rest state without being used for production of any single-faced corrugated paperboard sheet. In the specification, a cartridge currently located in the operational position is referred to as "operational cartridge", and a cartridge currently located in the rest position is referred to as "rest cartridge".

In FIG. 1, the first cartridge 1 corresponds to the operational cartridge, and the second cartridge 2 corresponds to the rest cartridge.

The first cartridge 1 has a cartridge base 1a for allowing the corrugating roll pair 11, 12 to be attached thereto, and the second cartridge 2 has a cartridge base 2a for allowing the corrugating roll pair 21, 22 to be attached thereto. Each of the cartridge bases 1a, 2a is formed in an approximately rectangular outer shape in front view to have approximately the same size. Each of the cartridge bases 1a, 2a has an engagement protrusion 13, 23 provided at an upper end thereof, an engagement recess 14, 24 provided at a lower end thereof, and a concave-shaped lockable seat 15, 25 formed in each of opposite lateral sides thereof.

In the single facer body 3, the frame structure having an approximately rectangular outer shape in front view internally has a lateral transfer passage 31, 32 each configured to allow each of the first cartridge 1 and the second cartridge 2 to be transferred therethrough in a lateral (right-left) direction, and an up-down directional transfer passage 33 configured to allow each of the first cartridge 1 and the second cartridge 2 to be transferred therethrough in an up-down direction. The up-down directional transfer passage 33 is formed in a laterally central region of the single facer body 3 to extend approximately vertically. The lateral transfer passage 31, 32 and the up-down directional transfer passage 33 intersect each other to form an inverted T shape. The first cartridge 1 currently serving as the operational cartridge is disposed in the up-down directional transfer passage 33. On the other hand, the second cartridge 2 currently serving as the rest cartridge is disposed in a laterally central region of the lateral transfer passage 31, 32. Each of laterally opposite ends of the lateral transfer passage 31, 32 is formed as a retraction space for allow one of the cartridges to be temporarily retracted during a corrugating roll pair exchanging work.

The lateral transfer passage 31, 32 is formed to extend approximately horizontally at a height position close to a floor of a factory on which the single facer body 3 is installed. A conveyance device 6 is provided between a lower end of the lateral transfer passage 31, 32 and the floor of the factory. The conveyance device 6 comprises a chain belt 61 for conveying one of the cartridges in the lateral direction while placing the cartridge thereon, and a first drive motor 62 for driving the chain belt 61. The chain belt 61 is provided to extend over the right and left ends of the lateral transfer passage 31, 32.

A hydraulic jack 4 is provided in the laterally central region of the lateral transfer passage 31, 32 to jack up and down the second cartridge 2 currently serving as the rest cartridge, in the up-down direction, and hold the second cartridge 2 at a raised position in a resting state.

A clamp mechanism 34 as a locking member is mounted at an up-down directionally intermediate position of the up-down directional transfer passage 33, in such a manner as to be extendable and retractable with respect to an inside of the up-down directional transfer passage 33. The clamp mechanism 34 has a pawl configured to be actuated by a non-illustrated fluid pressure cylinder. When the pawl of the clamp mechanism 34 is extended into the up-down directional transfer passage 33, the pawl comes into contact with the lockable seat 15 of the first cartridge 1 currently serving as the operational cartridge. Then, when the pawl of the clamp mechanism 34 comes into contact with or clamps the lockable seat 15, an upward displacement of the first cartridge 1 currently serving as the operational cartridge is restricted.

The single facer body 3 is provided with a lifting and lowering device 5 for lifting and lowering the first cartridge 1 or the second cartridge 2 between the operational position and the rest position. The lifting and lowering device 5 comprises a second drive motor 51, a drive belt 52, a lifting and lowering threaded shaft 53, and a lifting and lowering table 54.

The second drive motor 51 is disposed at a left corner of an upper end of the single facer body 3, in a posture where a drive shaft thereof is oriented upwardly. The drive belt 52 is disposed to couple a pulley of the drive shaft of the second drive motor 51 and a pulley of the lifting and lowering threaded shaft 53 together. The lifting and lowering threaded shaft 53 is disposed to extend from the upper end of the single facer body 3 to a lower end 33a of the up-down directional transfer passage 33, and pivotally supported at the upper and lower ends. The lifting and lowering table 54 is coupled to a lifting and lowering nut 55 configured to be lifted and lowered along with rotation of the lifting and lowering threaded shaft 53. The lifting and lowering table 54 is configured to be moved along the up-down directional transfer passage 33, while being lockingly engaged with the upper end of the first cartridge 1 or the second cartridge 2. The lifting and lowering table 54 is guided by a guide rail 35 provided in the single facer body 3.

<Process for Positioning and Fixing Corrugating Roll Pair During Operation>

Next, a process for positioning and fixing the corrugating roll pairs during operation of the single facer will be described based on FIG. 1.

During operation of the single facer 100, the second cartridge 2 currently serving as the rest cartridge supports the first cartridge 1 currently serving as the operational cartridge. In this state, an actuating pin 41 of the hydraulic jack 4 is kept in an upwardly extended position and in contact with the lower end of the second cartridge 2, during the single facer operation. Further, the pawl of the clamp mechanism 34 is in contact with or clamps the lockable seat 15 of the first cartridge 1. The engagement protrusion 23 of the second cartridge 2 is engaged with the engagement recess 14 of the first cartridge 1.

In this embodiment, each of the cartridge bases 1a, 2a of the first and second cartridge 1, 2 is configured to pivotally support the pair of corrugating rolls as a heavy roll, while arranging them side-by-side in the up-down direction. This means that each of the cartridge bases 1a, 2a is designed to be enhanced in up-down directional strength.

Thus, as a result of supporting the first cartridge 1 currently serving as the operational cartridge from therebelow by the second cartridge 2 currently serving as the rest cartridge enhanced in up-down directional strength with the same level, it becomes possible to supplement the frame strength of the single facer body 3 to thereby stably position and fix the corrugating roll pair 11, 12 located in the operational position.

In the embodiment, the operational cartridge and the rest cartridge are positioned and fixed in such a manner as to clampingly press them against each other in the up-down direction by the clamp mechanism 34 as the locking member and the hydraulic jack 4 as the actuating member.

Thus, the operational cartridge and the rest cartridge become less likely to undergo displacement not only in the up-down direction but also in the lateral direction. Further, the operational cartridge is apparently united with the rest cartridge, so that resonant vibration of the operational cartridge occurring during the single facer operation is significantly reduced.

In the embodiment, the engagement protrusion 23 of the second cartridge 2 is engaged with the engagement recess 14 of the first cartridge 1, so that it becomes possible to further reliably prevent displacement in the lateral direction.

In the embodiment, the locking member is composed of the clamp mechanism 34, so that it becomes possible to more strongly lock the operational cartridge by the frame of the single facer body 3.

In the embodiment, the actuating member is composed of the hydraulic jack 4, so that it becomes possible to stably maintain a required pushing force.

Therefore, the corrugating roll pair (11, 12) located in the operational position is positioned and fixed during the single facer operation.

<Corrugating Roll Pair Exchanging Process Inside Single Facer>

Figure 2:
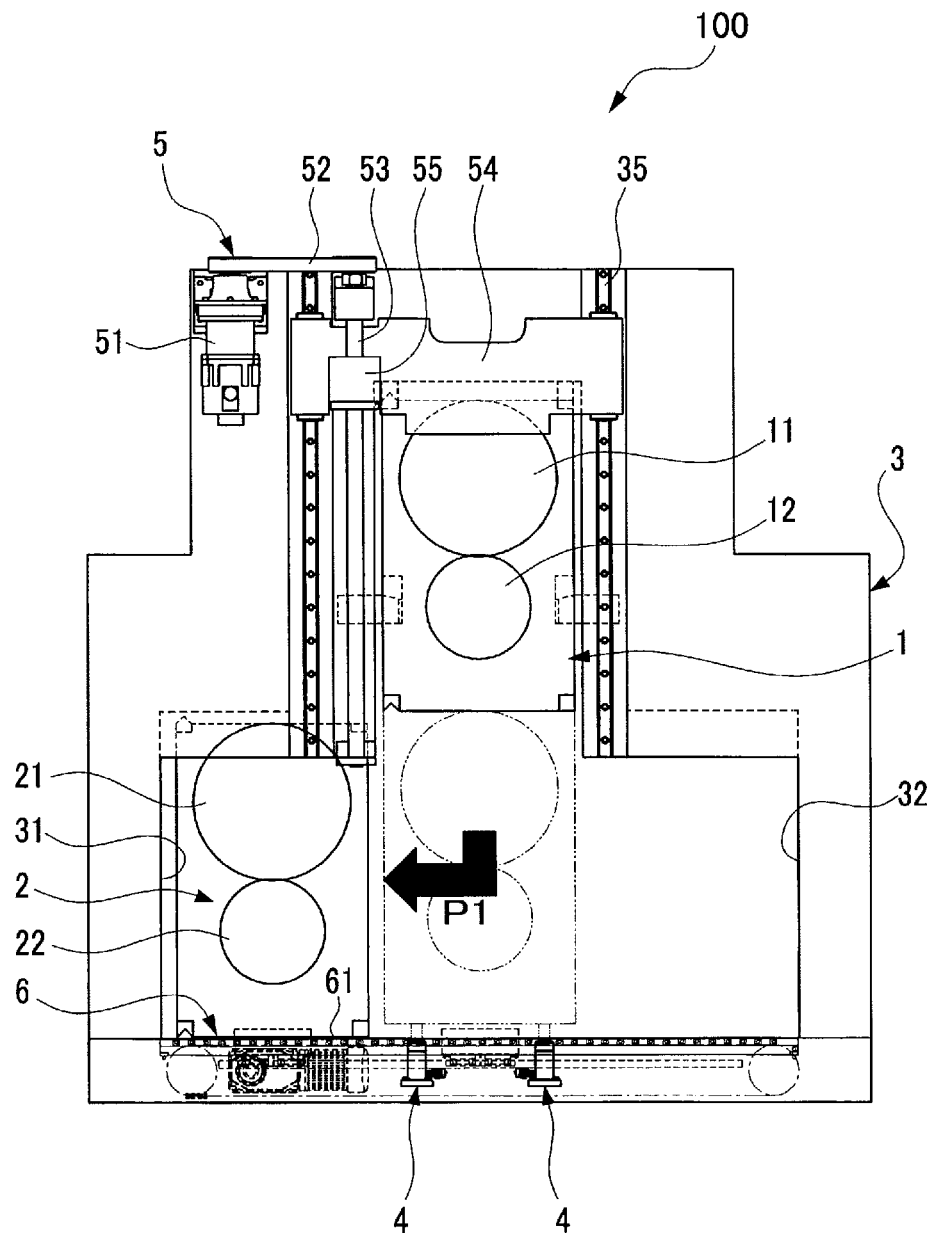
FIG. 2 is a front view of the single facer illustrated in FIG. 1, in a course of a corrugating roll pair exchanging process (Step P1).
Figure 3:
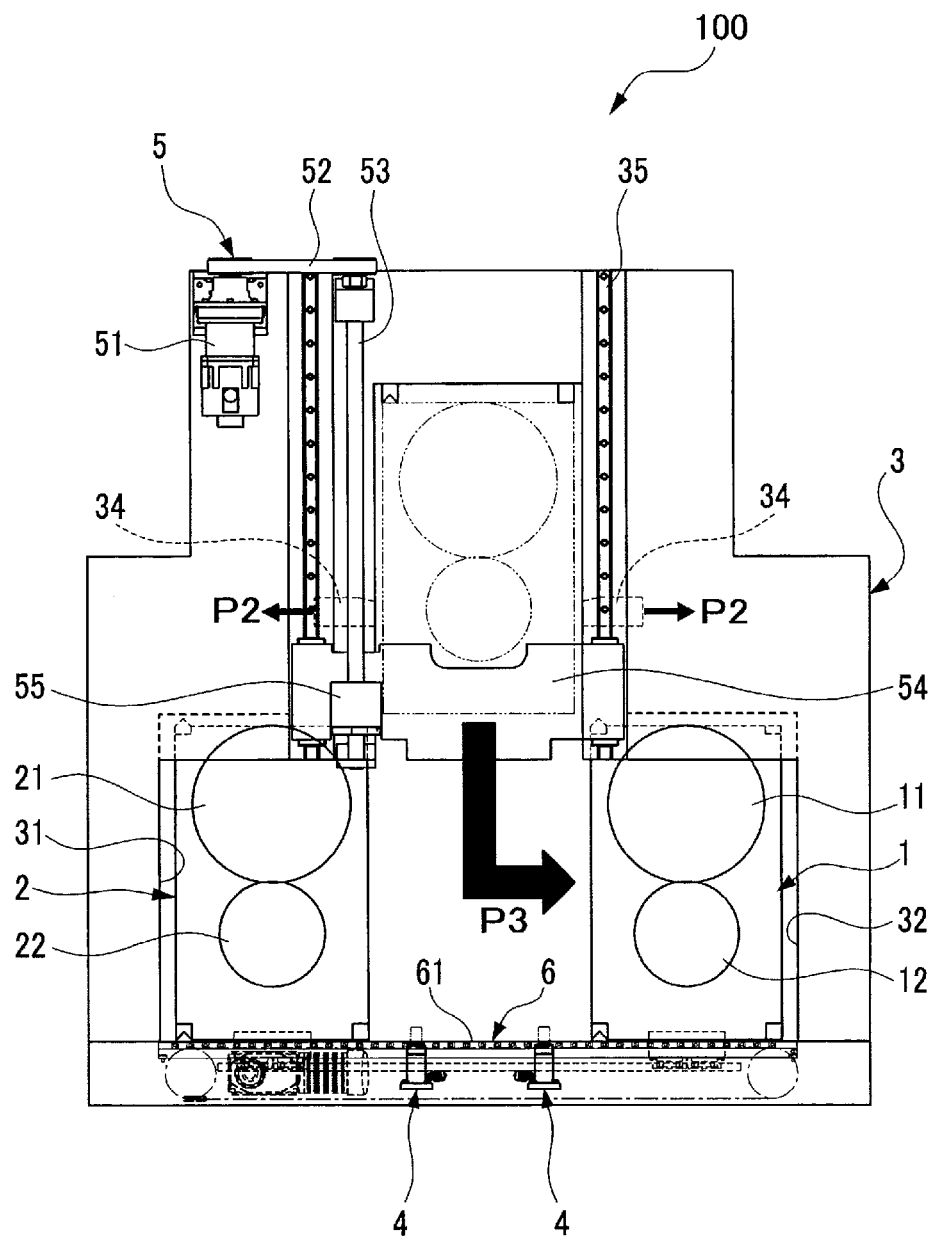
FIG. 3 is a front view of the single facer illustrated in FIG. 1, in the course of the corrugating roll pair exchanging process (Steps P2 and P3).
Figure 4:
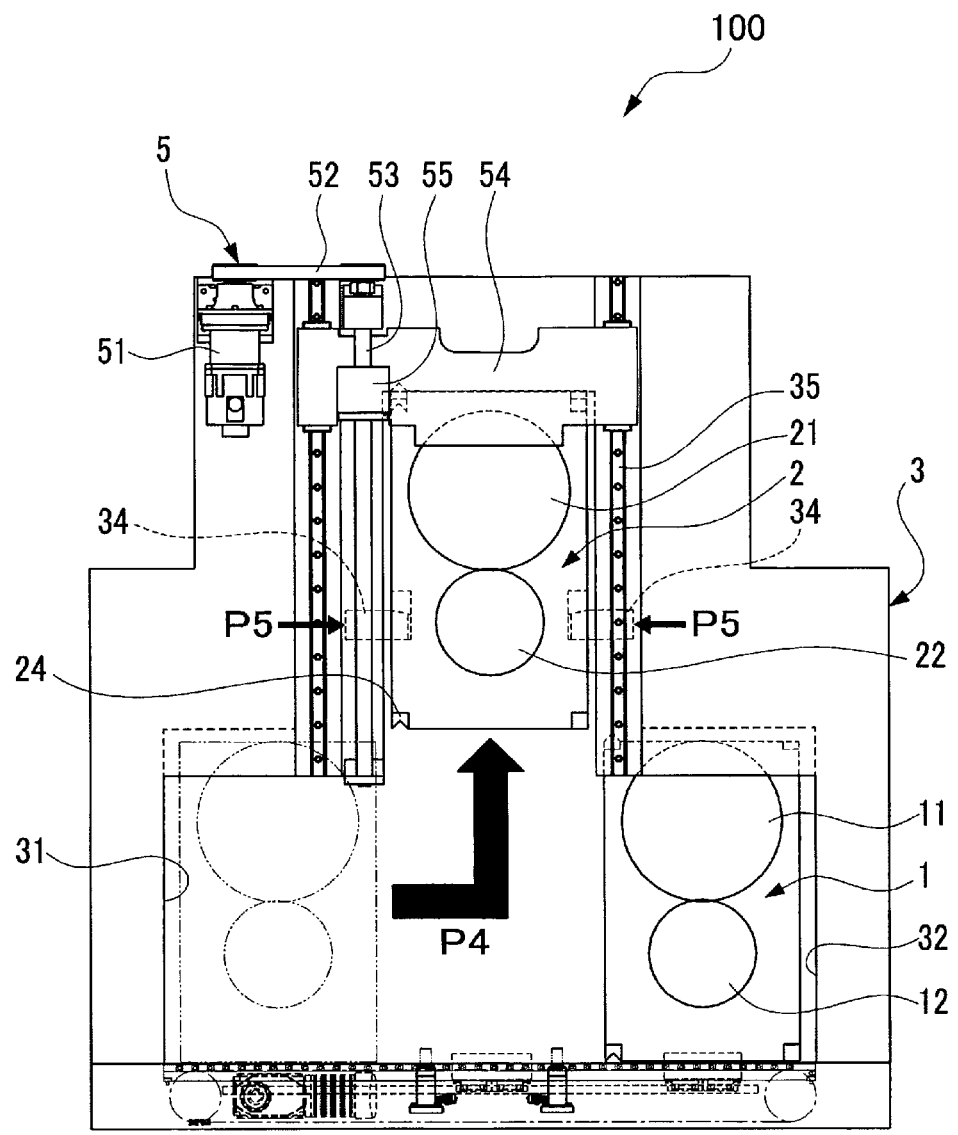
FIG. 4 is a front view of the single facer illustrated in FIG. 1, in the course of the corrugating roll pair exchanging process (Steps P4 and P5).
Figure 5:
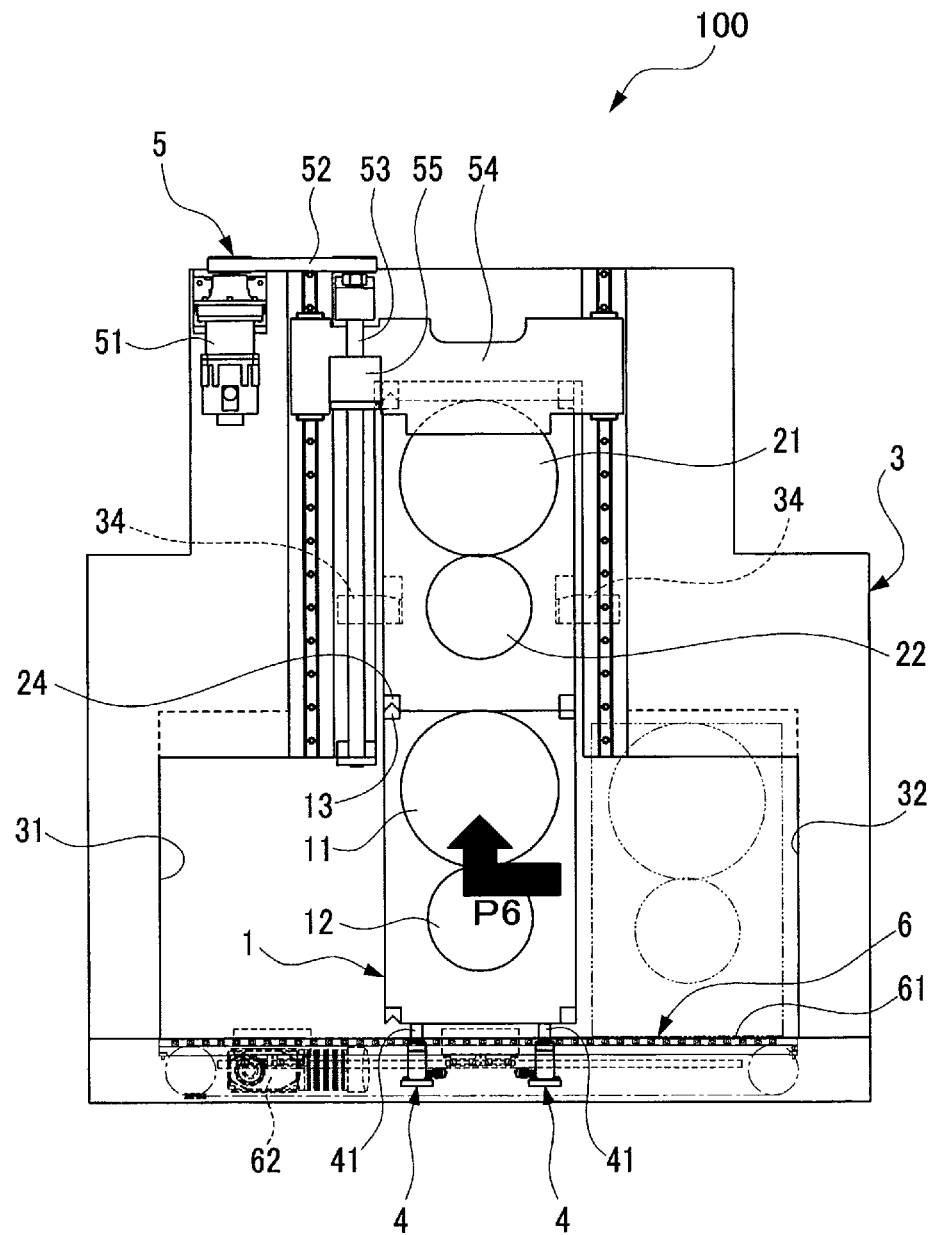
FIG. 5 is a front view of the single facer illustrated in FIG. 1, in the course of the corrugating roll pair exchanging process (Step P6).

Next, a corrugating roll pair exchanging process inside the single facer during non-operation of the single facer will be described based on FIGS. 2 to 5. FIG. 2 is a front view of the single facer illustrated in FIG. 1, in a course of a corrugating roll pair exchanging process (Step P1). FIG. 3 is a front view of the single facer illustrated in FIG. 1, in the course of the corrugating roll pair exchanging process (Steps P2 and P3). FIG. 4 is a front view of the single facer illustrated in FIG. 1, in the course of the corrugating roll pair exchanging process (Steps P4 and P5). FIG. 5 is a front view of the single facer illustrated in FIG. 1, in the course of the corrugating roll pair exchanging process (Step P6).

The work of exchanging between the operational cartridge and the rest cartridge can be performed by the following process (Step P1 to Step P6).

First of all, in Step P1 illustrated in FIG. 2, the second cartridge 2 located in the rest position (currently serving as the rest cartridge) is retracted toward one lateral transfer passage 31 formed in a left region of the lateral transfer passage.

Specifically, the actuating pin 41 of the hydraulic jack 4 supporting the second cartridge 2 is retracted downwardly to allow the second cartridge 2 to be placed on the chain belt 61 of the conveyance device 6. Then, the chain belt 61 is circulated leftwardly to transfer the second cartridge 2 from the rest position to a first retraction position in the lateral transfer passage 31. In this process, the first cartridge 1 is located in the operational position, while being locked to the lifting and lowering table 54 of the lifting and lowering device 5.

Subsequently, in Step P2 and Step P3 illustrated in FIG. 3, the first cartridge 1 located in the operational position (currently serving as the operational cartridge) is transferred downwardly to the rest position, and then retracted toward the other lateral transfer passage 32 formed as a right region of the lateral transfer passage.

Specifically, in the Step P2, the pawl of the clamp mechanism 34 is retracted outside the up-down directional transfer passage 33. Then, in the Step P3, the second drive motor 51 of the lifting and lowering device 5 is activated to rotate the lifting and lowering threaded shaft 53 to allow the first cartridge 1 locked to the lifting and lowering table 54 to be transferred downwardly to the rest position and placed on the chain belt 61. Then, the chain belt 61 is circulated rightwardly to transfer the first cartridge 1 from the rest position to a second retraction position in the lateral transfer passage 32.

Subsequently, in Step P4 and Step P5 illustrated in FIG. 4, the second cartridge 2 retracted to the lateral transfer passage 31 is returned to the rest position, and then transferred upwardly to the operational position.

Specifically, in the Step P4, the chain belt 61 is circulated rightwardly to transfer the second cartridge 2 from the first retraction position to the rest position. Then, the lifting and lowering table 54 is operated to lock the second cartridge 2 and transfer the second cartridge 2 upwardly. Then, in the Step P5, the pawl of the clamp mechanism 34 is extended into the up-down directional transfer passage 33 and brought into contact with the lockable seat 25 of the second cartridge 2.

Subsequently, in Step P6 illustrated in FIG. 5, the first cartridge 1 retracted to the second retraction position in the lateral transfer passage 32 is transferred to the rest position to support the second cartridge 2 transferred upwardly to the operational position (newly serving as the operational cartridge), from therebelow.

Specifically, the chain belt 61 is circulated leftwardly to transfer the first cartridge 1 from the second retraction position to the rest position. Then, the actuating pin 41 of the hydraulic jack 4 is extended upwardly to allow the first cartridge 1 to come into contact with the lower end of the second cartridge 2.

The above process makes it possible to easily perform the work of exchanging between the corrugating roll pairs attached to the respective internal cartridges, and stabilize the positioning and fixing of the exchanged corrugating roll pair in the operational position.

<Corrugating Roll Pair Replacing Process Inside and Outside Single Facer>

Figure 6:
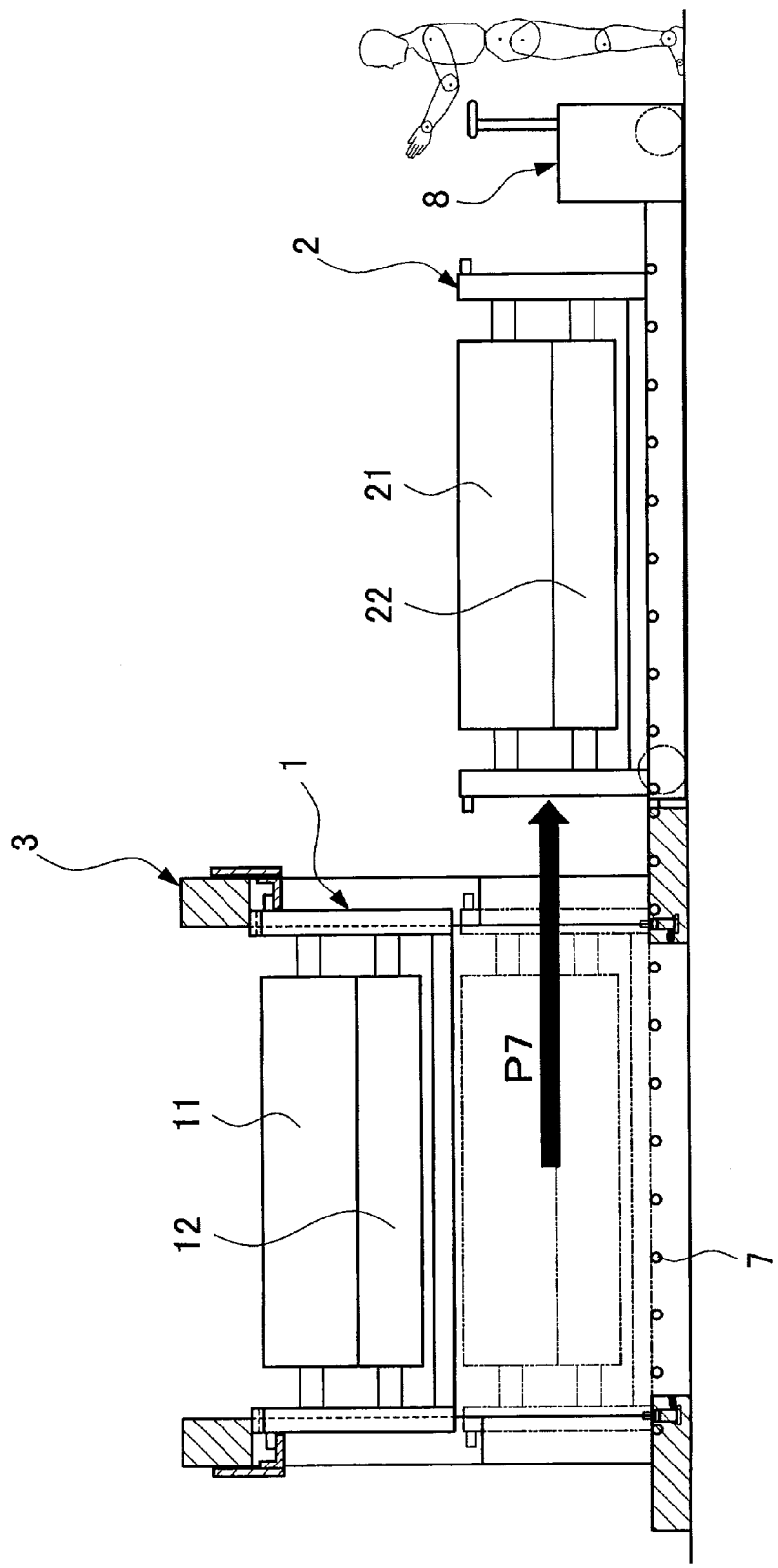
FIG. 6 is a side view of the single facer illustrated in FIG. 1, in a course of a corrugating roll pair replacing process (Step P7).

Next, a corrugating roll pair replacing process inside and outside the single facer during non-operation of the single facer will be described based on FIG. 6. FIG. 6 is a side view of the single facer illustrated in FIG. 1, in a course of a corrugating roll pair replacing process (Step P7).

The work of replacing an internal cartridge with an external cartridge can be performed by the following process (Step S7).

First of all, within the single facer, any cartridge to be not replaced is retracted toward the lateral transfer passage 31 or 32, and any cartridge to be replaced is transferred to the rest position. However, FIG. 6 illustrates an example in which the second cartridge 2 located in the rest position is replaced. Thus, the first cartridge 1 is kept in the operational position.

Therefore, in Step 7, the second cartridge 2 as an internal cartridge to be replaced is moved from the rest position in an axial direction of each corrugating roll and extracted outside the single facer. In this embodiment, a large number of rollers 7 are arranged in an extraction passage in the single facer body 3 to facilitate a movement of the cartridge. The extraction passage is formed at a height position close to that of the factory floor and in an approximately flat shape, so that there is no need to use a lifting and lowering device capable of conveying a heavy object, for the replacing work.

Then, the second cartridge 2 extracted outside the single facer is placed on a cartridge transport carriage 8 formed at the same height position as that of the extraction passage. An operator operates the cartridge transport carriage 8 to transport the second cartridge 2 to a given position, and then the second cartridge 2 is replaced with a new external cartridge.

Subsequently, the external cartridge is introduced axially from the cartridge transport carriage 8 to the rest position inside the single facer.

A process for transferring the introduced cartridge to the operational position; and transferring the retracted cartridge to the rest position to support the cartridge newly serving as the operational cartridge may be performed according to the aforementioned Steps P4 to P6.

The above process makes it possible to easily perform the internal-external cartridge replacing work.

<Modifications>

Various changes and modifications may be made in the above embodiment without departing from the spirit and scope of the present invention as set forth in appended claims.

In the above embodiment, the internal cartridge consists of the first cartridge 1 and the second cartridge 2. However, the present invention is not limited thereto.

For example, the number of internal cartridges may be three or more. In this case, the number of the rest cartridges is two or more, and the operational cartridge may be supported by one of the two or more rest cartridges. The remaining rest cartridges may be retracted into respective retraction positions in the lateral transfer passage (31, 32).

Further, a direction along which the rest cartridge supports the operational cartridge is preferably a vertical direction, as mentioned above. However, the support direction is not limited to a vertical direction, but may be an oblique direction.

What is claimed is:

1. A single facer for producing a plurality of types of single-faced corrugated paperboard sheets having different flute configurations, comprising:

a plurality of corrugating roll pairs, corrugating rolls in each pair being arranged in a vertical direction;

a plurality of cartridges each pivotably supporting a pair of corrugating rolls, each of the cartridges being adapted to serve selectively as (i) an operational cartridge supporting one of the corrugating roll pairs, when located in an operational position where one type of single-faced corrugated paperboard sheets is produced, or (ii) a rest cartridge supporting the one of the corrugating roll pairs, when located in a rest position where no single-faced corrugated paperboard sheet is produced, the operational cartridge and the rest cartridge being configured such that the operational cartridge is held in the operational position from below by the rest cartridge positioned in the rest position;

a single facer body having a frame structure that forms a transfer space therein for the cartridges;

a vertical transfer passage extending vertically in the single facer body and including the operational position and the rest position between which the cartridge is transferrable in the vertical direction;

a lateral transfer passage extending laterally in the single facer body and including at least two retraction positions and the rest position between which the cartridge is transferrable in a lateral direction;

a lifting and lowering device operable to lift or lower the cartridge between the operational position and the rest position along the vertical transfer passage; and a conveyance device operable to convey the cartridge between the retraction positions and the rest position along the lateral transfer passage.

2. The single facer according to claim 1, wherein:

the plurality of corrugating roll pairs consists of two pairs of corrugating rolls, and the plurality of cartridges consists of two cartridges;

the two pairs of corrugating rolls are pivotably supported by the two cartridges, respectively, wherein one of the two cartridges located in the operational position serves as the operational cartridge, and the other of the two cartridges located in the rest position serves as the rest cartridge; and the at least two retraction positions include a first retraction position and a second retraction position, the rest position being located between the first retraction position and the second retraction position.

3. The single facer according to claim 1, which the single facer further comprises a locking member configured to support the operational cartridge in the operational position, and an actuating device operable to move the rest cartridge upwardly.

4. The single facer according to claim 3, wherein the locking member includes a clamp mechanism configured to clamp a lateral side of the operational cartridge, and the actuating device includes a hydraulic jack operable to push a lower surface of the rest cartridge upwardly.

5. A corrugating roll pair exchanging method for the single facer according to claim 1, comprising:

retracting by the conveyance device a first cartridge serving as the rest cartridge from the rest position to a first retraction position along the lateral transfer passage in the lateral direction;

transferring by the lifting and lowering device a second cartridge serving as the operational cartridge from the operational position to the rest position along the vertical transfer passage and then by the conveyance device from the rest position to a second retraction position along the lateral transfer passage, the second retraction position being different from the first retraction position in which the first cartridge is positioned;

transferring by the conveyance device the first cartridge from the first retraction position to the rest position along the lateral transfer passage and then by the lifting and lowering device from the rest position to the operational position along the vertical transfer passage to allow the first cartridge to serve as the operational cartridge; and transferring by the conveyance device the second cartridge from the second retraction position to the rest position along the lateral transfer passage to allow the second cartridge to serve as the rest cartridge, whereby the corrugating roll pair in the first cartridge located in the operational position and the corrugating roll pair in the second cartridge located in the rest position are exchanged.

* * * * *